(12) United States Patent
Patriquin

(10) Patent No.: US 8,447,791 B1
(45) Date of Patent: May 21, 2013

(54) SYSTEMS AND METHODS FOR ALTERING LIMIT KEY VALUES

(75) Inventor: Timothy J. Patriquin, Austin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 13/437,757

(22) Filed: Apr. 2, 2012

(51) Int. Cl.
*G06F 17/30* (2006.01)

(52) U.S. Cl.
USPC .......................................................... 707/803

(58) Field of Classification Search
USPC .................................. 707/2, 3, 803; 709/225
See application file for complete search history.

(56) References Cited

U.S. PATENT DOCUMENTS 6,269,375 B1 * 7/2001 Ruddy et al. .......................... 1/1

OTHER PUBLICATIONS

"Alter and Change Manager for DB2, Reference Manual," BMC Software, Inc., Apr. 8, 2011, pp. 79 and 87 (of 520 pages).

* cited by examiner

*Primary Examiner* — Etienne LeRoux
(74) *Attorney, Agent, or Firm* — Brake Hughes Bellermann LLP

(57) ABSTRACT

In one aspect, a computer-implemented method for generating commands used to modify a plurality of limit key values includes determining a current value for each of the plurality of limit keys, determining a new value for each of the plurality of limit keys, and generating a normalized internal key for the current values and the new values of each of the limit keys. The method further includes iteratively determining a sequence order for each limit key using the current normalized internal keys and the new normalized limit keys and using the sequence order of each limit key to generate commands used to change the value of each limit key from the current value to the new value. The method may also include generating data used to indicate that a sequence order could not be determined.

25 Claims, 5 Drawing Sheets

SYSTEMS AND METHODS FOR ALTERING LIMIT KEY VALUES

TECHNICAL FIELD

The subject matter of the present disclosure relates to systems and methods related to automatically altering limit key value ordering.

BACKGROUND

A database is an organized collection of data. Databases commonly organize the data into spaces, tables, indexes, columns, and rows. For example, a column (also referred to as a field) may represent an individual datum, such as a first name or a last name. Columns having some relation are stored together in a table. For example, a first name, last name, birthdate, and address field may be stored together in a table (often referred to as a table space) that describes a person. The actual instances of data are stored in a row. In the example above, "Judy" "Smith" "Oct. 2, 1975" may be a row in the described table. An index stores a subset of the columns in a table and is used to more quickly access a row of the table.

In some instances, database table spaces may be divided into partitions, with each partition capable of being processed independently by database utilities. Such partitioning is often used to improve table availability, performance, and maintenance. In a partitioned table space, each partition may be assigned a high key value, also known as a limit key, and the database system may assign rows to a partition using these limit key values. For example, in a database with four partitions, the first partition may store rows with a last name between "Aanuk" and "Graham," the second partition may store rows with a last name between "Graham" and "Lewis," the third partition may store rows with a last name between "Lewis" and "Smith," and the last partition may store the remaining names. In such an example, the first partition may have a limit key of "Graham", the second partition may have a limit key of "Lewis," the third partition may have a limit key of "Smith" and the remaining partition may have a limit key of "Zwillig," "ZZZ," or high values (in some database environments, the limit key of the final partition may be ignored).

The value of the limit key for each partition may be changed by a database administrator for various reasons, such as to re-balance the partitions. In systems that alter the limit key of each partition using a single command, this process is fairly straightforward. But in systems that require an alter command for each partition, determining the order of the alter commands for the various partitions can be complex. For example in a DB2 database system, if a database administrator attempts to issue an alter command for a partition that changes the limit key to a value higher than the next partition's current limit key, the command will fail with a sequencing error. For example, consider the limit key changes represented in the following table, with column A representing the current limit key value for each partition and column B representing the new (or desired) limit key value:

| Partition Number | Current Limit Key | New Limit Key |
|---|---|---|
| 1 | 200 | 100 |
| 2 | 300 | 175 |
| 3 | 500 | 550 |
| 4 | 600 | 600 |
| 5 | 700 | 1200 |
| 6 | 1000 | 1500 |

Using a first-to-last strategy for executing the alter commands the first partition can be immediately changed to 100 because the second partition's existing key is 300 (the new value of 100<300). The second partition can be changed from 300 to 175 because partition 3 currently has a value of 550 (175<550). The fourth partition is not being changed. However, the fifth partition's key of 700 cannot be altered to 1200 because the current key of partition 6 is 1000 (1200>1000); thus, the ALTER command for partition 5 would fail with an out-of-sequence condition. For this to be a valid sequence, partition 6 must first be altered to 1500. Then partition 5 can be changed to 1200.

Using a last-to-first strategy, partition 6 can be modified from 1000 to 1500 since it is greater than its current value and it is the last partition for the object. Partition 5 can be altered from 700 to 1200 since partition 6 has already been modified from 1000 to 1500 (1200<1500). No change was requested for partition 4. Partition 3 can now be changed from 500 to 550. However, partition 2 cannot be changed from 300 to 175 because the first partition's current value of 200 would cause an out-of-sequence condition. For these changes to be implemented, partition 1 first needs to be altered to 100 before the second partition can be changed to 175. Thus, in the example above, neither straightforward sequence solution (first-to-last or last-to-first) results in successfully updating the limit key values.

As the number of partitions increases, the task of determining the correct alter sequence for the partitions becomes increasingly difficult. The task may be further complicated by limit keys that include a combination of columns. For example, the limit keys for the partitions of a table may include three columns, a character column in descending order, a data column in ascending order, and an integer column in ascending order, making comparison of limit key values increasingly difficult. Furthermore, limit key changes are often performed at night or on weekends to minimize the impact of database down time on users. Thus, a failed attempt to update the limit keys may not be discovered right away. Additionally, a failed update attempt may incur complex and time-consuming restart processing that elongates the outage window for the affected database partitions.

To avoid the time and monetary costs associated with failed attempts at changing limit keys, a need exists for a system and method for determining whether the proposed new limit keys can result in a successful series of alter statements and, if so, determine the successful sequence order and automatically generate commands to execute the limit key changes.

SUMMARY

In one general aspect, a computer-implemented method for automatically generating commands used to change a plurality of limit key values includes determining a current value for each of the plurality of limit keys, each limit key corresponding to a partition of a plurality of database partitions. The method also includes determining a new value for each of the plurality of limit keys, generating a normalized internal key for the current value of each limit key and for the new value of each limit key and iteratively determining a sequence order for each limit key using the current normalized internal keys and the new normalized internal keys. The method may also include using the determined sequence order of each limit key to generate the commands used to change the value of each limit key from the current value to the new value.

Implementations can include one or more of the following features. When the database partitions are DB2 database partitions the commands used to change the value of each limit key may include ALTER commands and CREATE commands. The method may further include generating a one's complement of the normalized internal key when a sort order for the limit key is descending. Each limit key may comprise at least two columns and generating the normalized internal key may include appending a normalized internal key for a second column to a normalized internal key of a first column. The method may further include determining that a user has not supplied a new value for the limit key of a particular partition and copying the current value of the limit key for the particular partition to the new value of the limit key for the particular partition in response to the determining.

In some implementations, iteratively determining the sequence order for each limit key may include tracking a number of iterations and, with each iteration beginning at a first partition and determining a first limit key having a sequence order of zero. Iteratively determining the sequence order may also include determining whether a successive partition's limit key has a sequence order greater than zero and determining whether the new normalized internal key of the first limit key is less than the new normalized internal key of the successive partition's limit key. The method may also include setting the sequence order of the first limit key to the number of iterations when it is determined that the new normalized internal key of the first limit key is less than the new normalized internal key of the successive partition's limit key.

In another general aspect, a computer program product being tangibly embodied on a computer-readable storage device can be configured to store instructions that, when executed, cause a processor to perform a process. The instructions can include instructions to determine a current value for each of a plurality of limit keys, each limit key corresponding to a partition of a plurality of database partitions, to determine a new value for each of the plurality of limit keys, and to generate a current normalized internal key for the current value of each limit key and for the new value of each limit key. The instructions may also include instructions to iteratively determine a sequence order for each limit key using the current normalized internal key and the new normalized internal key and to generate data used to indicate the sequence order for each limit key to a user.

Implementations can include one or more of the following features. The instructions to generate the data used to indicate the sequence order may include instructions to generate an alert indicating that the sequence order could not be determined. The instructions to generate the data used to indicate the sequence order may include instructions to generate commands used to change the value of each limit key from the current value to the new value.

In another general aspect, a computer system for automatically generating commands used to change a plurality of limit key values includes instructions recorded on a non-transitory computer-readable medium and executable by at least one processor. The system may also include a partitioned database having a particular number of partitions, each partition being associated with a limit key of the plurality of limit keys and a limit key normalizer. The limit key normalized may be configured to determine a current value for each of the limit keys, to determine a new value for each of the limit keys, to generate a current normalized internal key for the current value of each limit key, and to generate a new normalized internal key for the new value of each limit key. The system may also include a limit key partition sequencer configured to determine a sequence order for the limit key of each partition by comparing the current normalized internal keys and the new normalized internal keys in an iterative process occurring the particular number of times. The system may also include a command generator configured to use the determined sequence order of each limit key to generate the particular number of commands, the commands being used to change the current value of each limit key to the new value.

Implementations can include one or more of the following features. The partitions may be DB2 database partitions and the commands used to change the current value of each limit key may include ALTER and CREATE commands. The ALTER commands may be generated in an order that corresponds with the sequence order of the limit keys. Each limit key may comprise at least two columns and the limit key normalizer may be configured to append a current normalized internal key for a second column to a current normalized internal key of a first column to create the internal key as part of generating a current normalized internal key. The limit key normalizer may be further configured to convert the new value for a limit key with a date data type to a year-month-day format, to convert the new value for a limit key with an integer data type to a binary number without commas, and to convert the new value for a limit key with a character data type to a fixed-length hexadecimal. The limit key normalizer may be further configured to determine that the new values for the limit keys do not resolve to a valid determined sequence and to generate data to alert a user that the new values for the limit keys are not valid.

In some implementations, the system may include a limit key normalizer that is further configured to determine that a user failed to supply a new value for a particular limit key of the plurality of limit keys, to assign the new value for the particular limit key to low values when a sort order for a column associated with the particular limit key is ascending, and to assign the new value for the particular limit key to high values when the sort order for the column associated with the particular limit key is descending.

The details of one or more implementations are set forth in the accompanying drawings and the description below. Other features will be apparent from the description and drawings, and from the claims.

DETAILED DESCRIPTION

The systems and methods described herein can be used to facilitate limit key modifications. Specifically, disclosed implementations include systems and methods that receive new limit key values for the partitions of a table space, convert the current value of the limit keys and the new values of the limit keys to a normalized internal key, and use the normalized internal keys to determine the proper sequence of commands used to convert the current values to the new values. The systems and methods may also identify situations where the new limit key values do not result in a valid sequence and notify a database administrator, or other user, that the proposed new limit key values have a sequence problem. Thus, disclosed implementations save time and money by allowing the database administrator to determine, before a job is scheduled to alter the limit keys, whether the job will successfully complete or not.

Figure 1:
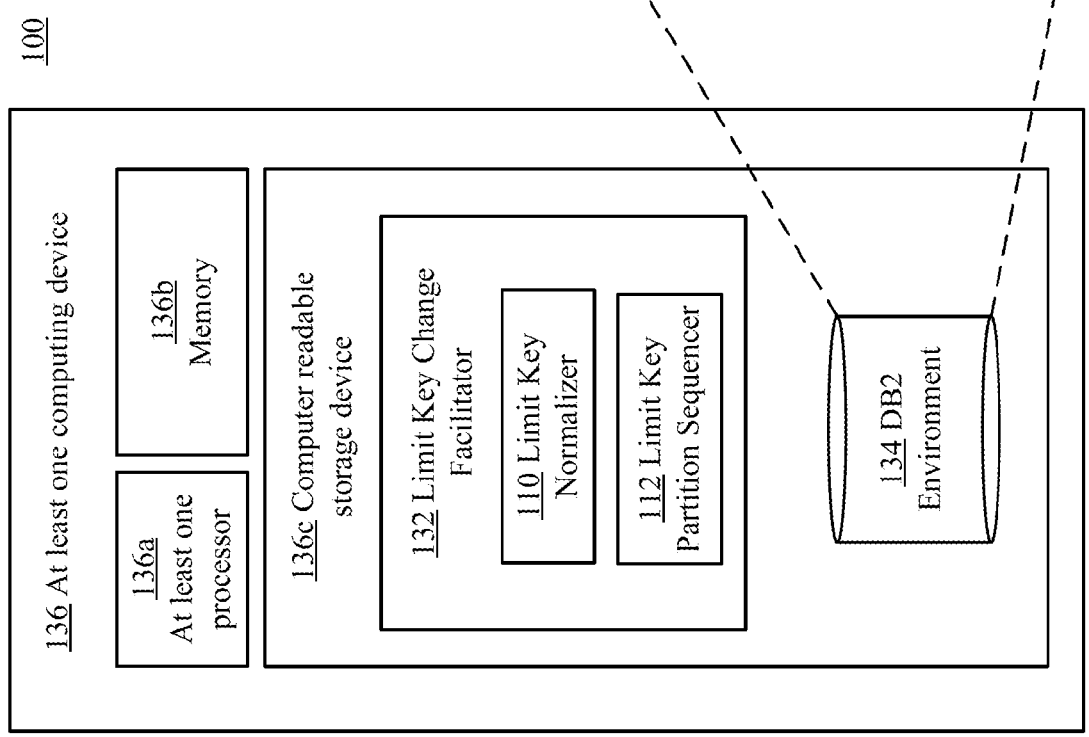
FIG. 1 is a block diagram that illustrates a limit key alteration system for determining the sequence order for modifying limit keys of database partitions, according to an implementation.

FIG. 1 is a schematic diagram that illustrates a limit key alteration system 100 for determining the sequence order for modifying limit keys of database partitions. The limit key alteration system 100 can be embodied, for example, on one or more computing devices 136. The limit key alteration system 100 can be, for example, a server that includes one or more computing devices 136. In some implementations, two or more computing devices 136 may be remotely located from each other but in communication with each other via a communications network (not shown). The network, for example, can be wired or wireless and can include, a local area network (LAN), a wide area network (WAN), etc., implemented using, for example, gateway devices, bridges, switches, and/or so forth. The network can include one or more segments and/or can have portions based on various protocols such as Internet Protocol (IP) and/or a proprietary protocol. The network can include at least a portion of the Internet. In some implementations, the network can include multiple computing devices and/or multiple server devices.

The computing device 136 can include one or more processors 136a configured to execute one or more machine executable instructions or pieces of software, firmware, or a combination thereof. The computing device 136 can include, an operating system (not shown) and one or more computer memories 136b, such as a main memory, configured to store data, either temporarily, permanently, semi-permanently, or a combination thereof. The memory 136b may include volatile memory, non-volatile memory, or a combination thereof. The computing device 136 can also include one or more storage mediums 136c, such as a non-transitory computer-readable storage disk configured to store data in a semi-permanent or substantially permanent form.

In some implementations, the computing device 136 may include one or more other hardware components not shown in FIG. 1, such as for example, a display or monitor, a keyboard, a touchscreen, a camera, a mouse, a touchpad, a trackpad, a video processor, etc., through which a user, such as a database administrator, may send data to and receive data from computing device 136. In some implementations, the user may use a second computing device (not shown) in communication with computing device 136 via a communications network, such as the network described above, to send data to and receive data from computing device 136.

The limit key alteration system 100 also includes a database 134 stored in one or more of storage mediums 136c (e.g., disk, main memory) of the computing device 136. The database 134 can be any database storing any type of data. In some implementations, the database 134 is a DB2 database. Database 134 may include several tables, such as tables A and B shown in FIG. 1. Each table may be divided into several partitions, as shown in FIG. 1. Each partition may have an associated limit key that defines the highest value that its corresponding partition stores. In some implementations the limit key for the last partition may be ignored when adding values to the table space.

Storage medium 136c may also store a limit key change facilitator 132. Limit key change facilitator 132 may include instructions that, when executed by the one or more of processors 136a, cause computing device 136 to perform certain functions. For example, limit key change facilitator 132 may include instructions to determine the current values of limit keys for a table space in database 134, determine new values for the limit keys, convert the current and new values to normalized internal values, and use the normalized internal values to determine a change sequence order for commands used to change the limit key values of the table space. For example, limit key change facilitator 132 may include module 110 that translates the current and new values for limit keys of a table space into normalized internal keys. In some implementations, the internal keys may be binary strings. Limit key change facilitator 132 may also include module 112 that uses the normalized binary strings to automatically determine the order that the limit key values should be changed to ensure that the change process completes successfully. In some embodiments, limit key change facilitator 132 may also include a command generator that generates the commands used to modify the limit keys.

Figure 2:
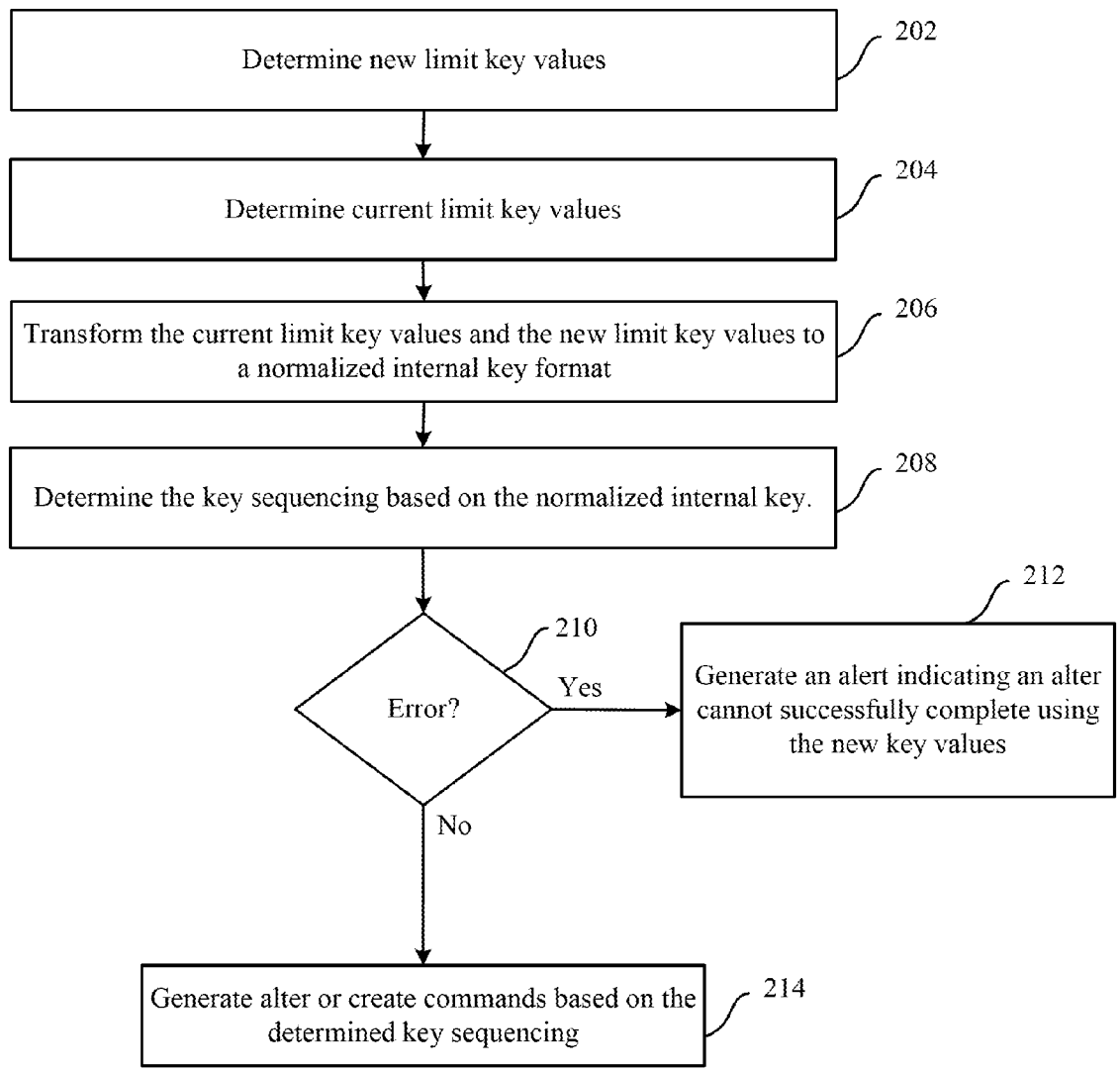
FIG. 2 is a flowchart illustrating a process of determining the sequence order for modifying limit keys and generating commands to successfully change the limit keys, according to an implementation.

FIG. 2 is a flowchart of a method 200 for determining the sequence order for modifying limit keys and generating commands to successfully change the limit keys. Process 200 may process and analyze current limit key values and new limit key values to provide a user with automatically generated commands that may successfully change the current values to the new values. In addition, process 200 may alert the user when the new limit key values cannot result in generation commands to achieve a successful change. In some implementations, process 200 may be performed by, for example, limit key change facilitator 132 of device 136.

At 202, limit key alteration system 100 may determine new limit key values for a particular table space. Limit key alteration system 100 may receive the new values from a user, such as a database administrator. In some implementations, the user may only supply new limit key values for some of the partitions in the table space. In such embodiments, as part of determining the new limit key values, limit key alteration system 100 may determine that a new limit key was not supplied for a particular partition and may copy the current limit key value for the particular partition to the new limit key value for the partition. Thus, if a new limit key value is unknown, limit key alteration system 100 may proceed with an assumption that the value for that limit key remains unchanged.

At 204, the limit key alteration system 100 may determine current limit key values for the particular table space. In some embodiments, limit key alteration system 100 may fetch the current limit key values from a data source. For example, in embodiments where the database is a DB2 database, the database system stores partition information in a catalog. The catalog is one or more files that contain information about the structure of a database space, including the limit keys for each partition of a table space. In other embodiments, limit key alteration system 100 may obtain the current values from a user. The limit key alteration system 100 may then transform the current limit key values and the new limit key values to a normalized internal key format (206). A comparison of the current values to the new values is necessary to properly determine a correct sequencing of the commands that alter the limit keys. In some situations a direct comparison may not be possible or, if possible, may not be straightforward. For example, character fields in the key may not be the same length, date and integer fields may not have the same format, and some fields may be ascending while others may be descending. Thus, to properly compare the current values to the new values, limit key alteration system 100 may account for such differences through normalization.

Figure 3:
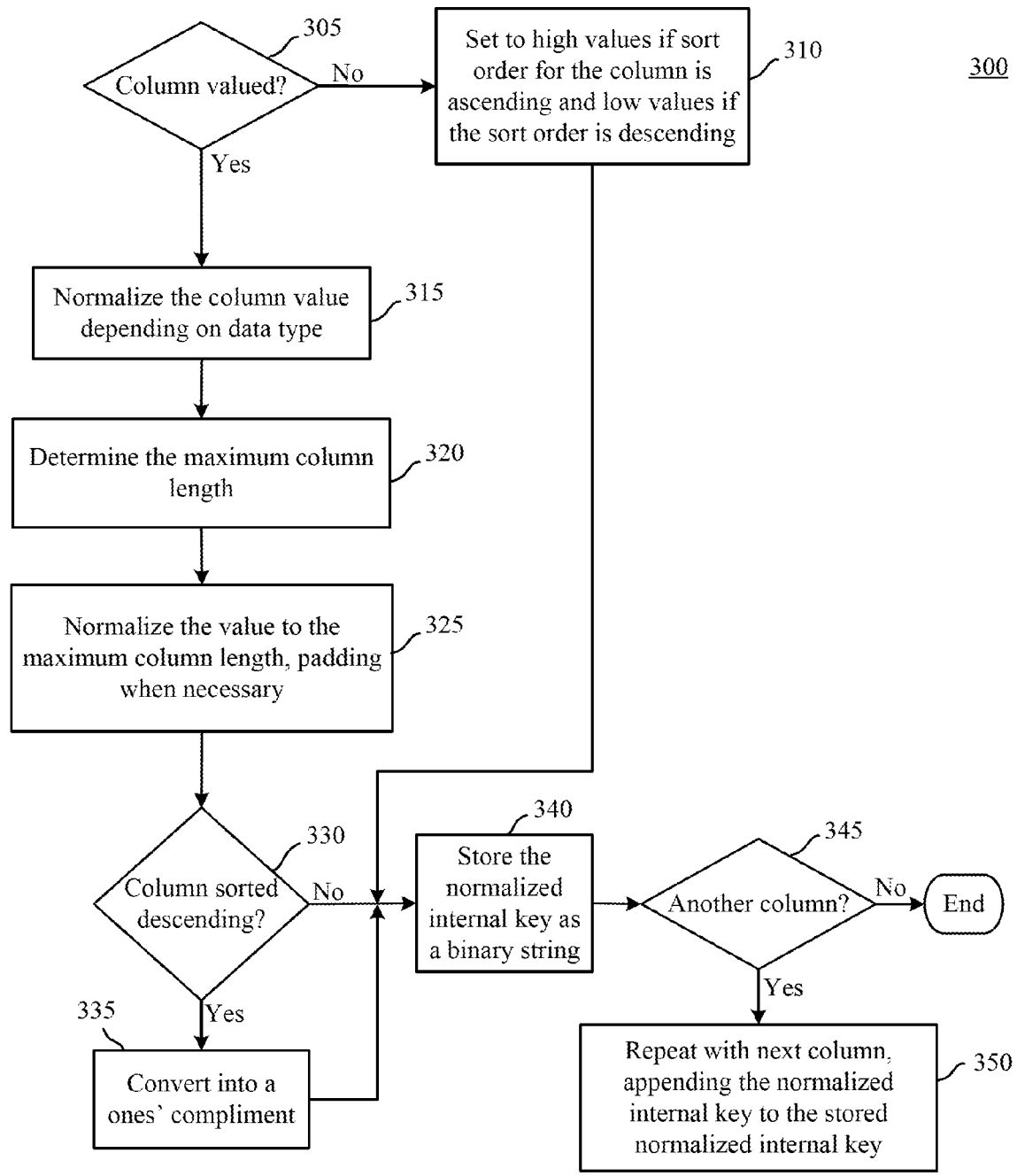
FIG. 3 is a flowchart illustrating a process of transforming the current limit key values and the new limit key values into a normalized internal key, according to an implementation.

FIG. 3 is a flowchart illustrating a process 300 of transforming the current limit key values and the new limit key values into a normalized internal key. Limit key normalizer 110 may cause limit key alteration system 100 to perform the steps of process 300 as part of step 206 in FIG. 2. Although FIG. 3 illustrates a normalization process for a single column in a limit key, the principles may be applied iteratively to each column that comprises a limit key. In such a situation, limit key alteration system 100 may append the normalized internal values for each column to form a single normalized internal value for each limit key. Limit key alteration system 100 may use process 300 to transform the value of current limit keys and the value of new limit keys.

At 305, limit key alteration system 100 may determine whether the column is valued or not. A valued column has some value that is a non-blank (e.g., non-null) value. For example, if a user does not supply a new value for a column, limit key alteration system 100 may consider the column non-valued. If the column is not valued (305, No), limit key alteration system 100 may set the internal key of the column to high values if the sort order for the column is ascending or to low values if the sort order is descending (310). As part of setting the internal key of the column, limit key alteration system 100 may determine a maximum length for the column (e.g. by using the catalog) and ensure that length of the internal key is equal to the maximum column length.

If the column is valued (305, Yes), limit key alteration system 100 may then normalize the value for the column (315). Normalization may depend on the type of data stored in each column used in the limit key. Accordingly, for a date column limit key alteration system 100 may normalize the column to a specific date format, for example to a YYYYM-MDD format (310). While other date formats are possible, the YYYYMMDD format allows dates to be sorted and compared with a simple binary comparison. For a time column, limit key alteration system 100 may normalize the column to an HHMMSS format for a 24 hour clock. For a numeric value, which may include an integer, a decimal, a float, a decimal float, etc., limit key alteration system 100 may normalize the value by removing commas, currency signs, or other such symbols, and ensuring the numeric value has a hexadecimal value. For example, if the column is defined as an integer with the value 500, limit key alteration system 100 may ensure the value is stored in two bytes as the hexadecimal value of 0x01F4. For character columns, limit key alteration system 100 may also convert the characters to a hexadecimal equivalent. For example, in implementations that use ASCII encoding, the character A is equivalent to 0x41. In such implementations, if the value of the column is ADAMS, limit key alteration system 100 may convert ADAMS to the hexadecimal representation 0x41444154. Although explained above using ASCII encoding, disclosed implementations may use other encoding methods to convert characters strings to hexadecimal numbers.

At 320, limit key alteration system 100 may determine the maximum column length for the column. For example columns may be defined (e.g., in the catalog) as having a predetermined number of digits, characters, places, etc., or as being a data type with a predetermined length (e.g. a short integer of two bytes, a long integer of eight bytes, a timestamp, etc.). Limit key alteration system 100 may use the column definition to determine the maximum column length for the internal key. For example, if the column is defined as a short integer, the value 500 may be stored in two bytes as the hexadecimal value of 0x01F4. However, if the column is defined as an integer, limit key alteration system 100 may store the hexadecimal value in four bytes (e.g., 0x000001F4). In another example, a character column may be defined as having 10 characters.

At 325, limit key alteration system 100 may normalize the value of the column to the maximum column length, padding the value when necessary. In other words, as part of the normalization process limit key alteration system 100 may ensure that the same number of bytes is used for all values of the column, regardless of the actual value being converted. This ensures that length of the internal key is the same for each partition. For example, for a character column limit key alteration system may pad the right with high values if a column is sorted ascending, so that the length of the internal key equals the length of the underlying column. For example, a character column with the value of ADAMS and a maximum column length of ten characters may result in an internal key of 0x41444154FFFFFFFFFF. But for a column with a descending sort, limit key alteration system 100 may pad the right with low values rather than high values. Similarly, an integer column with the value of 500 may be padded on the left with zeros to ensure that the internal key has a length equal to the maximum length of the column.

Although not specifically discussed above, disclosed implementations may also include a normalization and padding process for other data types, such as varchar, longvarchar, timestamp, biginteger, binary, varbinary, graphic, vargraphic, etc. For such data types, limit key alteration system 100 may include additional processes that remove formatting, ensures that the length of each normalized value is the same, and produces a value that is easily compared to another value using, for example, a binary compare operation.

Once limit key alteration system 100 has normalized and padded the column value, limit key alteration system 100 may determine whether the column has a descending sort order (330). If the sort order is descending (330, Yes), limit key alteration system 100 may convert the internal key to a one's compliment form (335). A one's compliment of a binary number flips the value of each one and each zero. Thus, a binary value of 1010 (a hex value of 0xA) becomes 0101 (a hex value of 0x5). The one's compliment allows a column having a descending sort order to be analyzed and compared with columns having an ascending order. At 340, limit key alteration system 100 may store the resulting normalized internal key in a memory, such as memory 136*b* of FIG. 1. Limit key alteration system 100 may store the internal key as a binary string. Such a string is shown in as string 420 of FIG. 4. At 345, limit key alteration system 100 may determine if the limit key contains another column. If so (345, Yes), limit key alteration system 100 may repeat steps 305 to 340 for the next successive column in the key. As part of step 340 for the next column, limit key alteration system 100 may append the normalized internal key for the current column to the normalized internal key of the previous column(s) and store the concatenated values as the normalized internal key. When no other columns exist for the limit key (345, No), process 300 ends.

Figure 4:
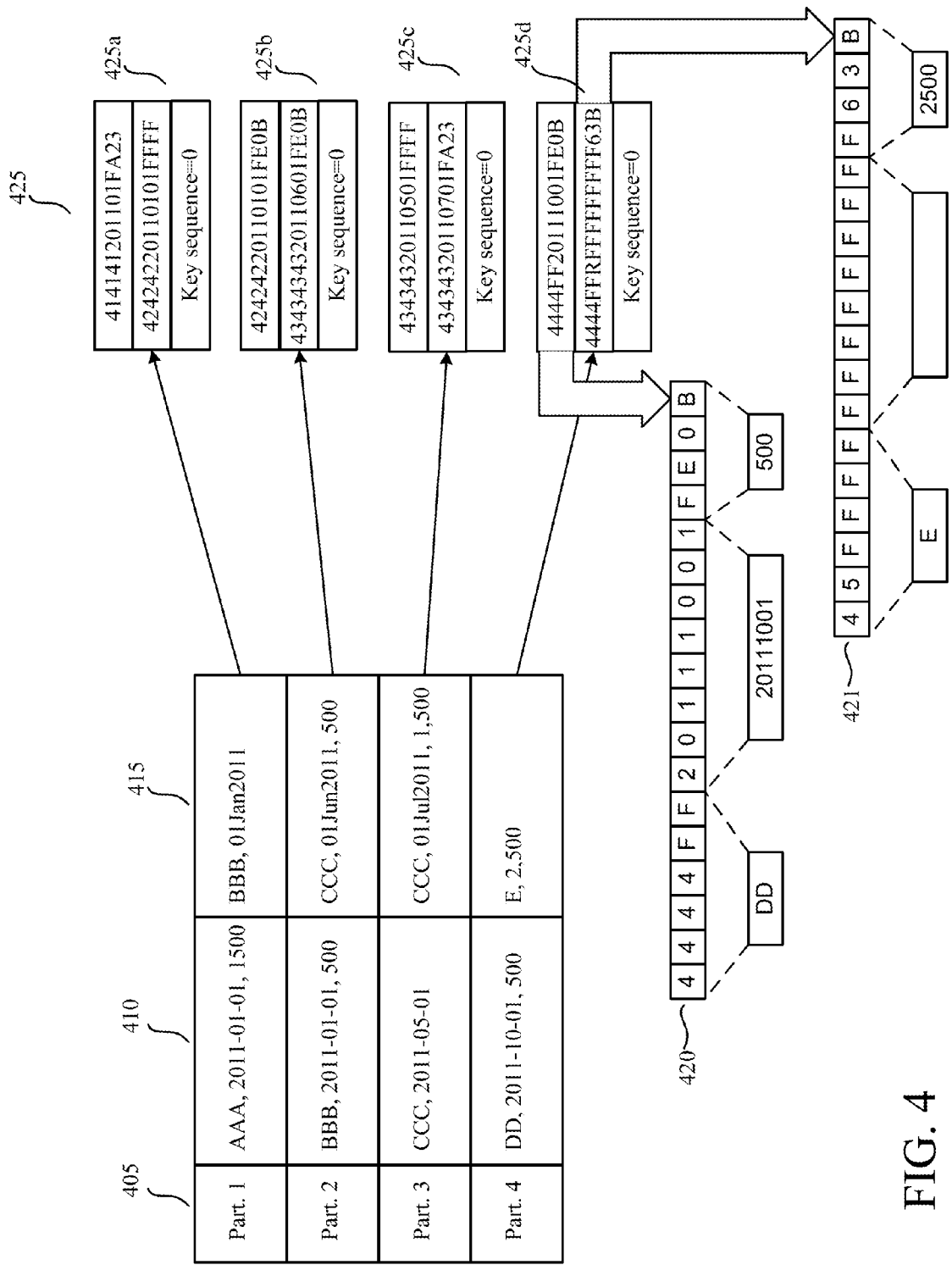
FIG. 4 is an example of current limit key values, new limit key values, and a record structure for storing the normalized internal key for use in determining the sequence order for modifying the limit keys, according to an implementation.

FIG. 4 is an example of current limit key values, new limit key values, and a record structure for storing the normalized internal key and determining the sequence order for modifying the limit keys. In the example of FIG. 4 the table space has four partitions 405 and the limit key for each partition is comprised of three values representing three columns. For example, the current limit key 410 of partition 1 has a character column of three characters sorted in ascending order, a date column sorted in ascending order, and a short integer column sorted in descending order. FIG. 4 shows the current limit key values 410 and the new limit key values 415 for each partition. As part of the limit key change process, limit key alteration system 100 may create a data structure 425 for each current key and new key for each partition. Data structure 425 may contain an entry for the current normalized internal key, the new normalized internal key, and a key sequence. The key sequence may initially be set to zero for all partitions. The key sequence may represent the sequence order for the commands that change the limit key values from the current value to the new value. For example, if partition three should be altered before partition 2, the key sequence for partition 3 should contain a value lower than the key sequence for partition 2.

Normalized internal key 420 of FIG. 4 represents the internal key for the current value of the limit key for partition four. In the example of FIG. 4, the first three bytes (shown as hexadecimal values in six nibbles in FIG. 4, a nibble representing four bits or half a byte) of the internal key represent the character column of three characters. Because the value of the current key of partition four had only two characters, and because the column has an ascending sort order, the final character position is padded with high values. The next four bytes represent the date column. As shown by the internal key for the new limit key value of partition 4, if a date is not given and the sort order is ascending, the eight bytes will be given high values. Finally, the last two bytes represent the short integer column sorted in descending order. Because the column is sorted in descending order the value in the internal key is a one's compliment of the actual value of the column. In the example of FIG. 4, the value of 500 (0x01F4) is represented as 0xFEOB, which is the one's compliment of 0x01F4. As depicted, the normalized binary strings for each column may be concatenated to form a single internal key for the partition.

Returning to FIG. 2, at 208 limit key alteration system 100 may determine the key sequencing for the partitions based on the normalized internal keys. For example, limit key alteration system 100 may use a recursive implementation where one partition's sequence order (for example, the key sequence value in the data structure 425) is determined by each pass of the partition list, causing the limit key alteration system perform the process one time for each partition in the table space. For example, in the example of FIG. 4 limit key alteration system 100 may perform the recursive process four times because the table space has four partitions.

Figure 5:
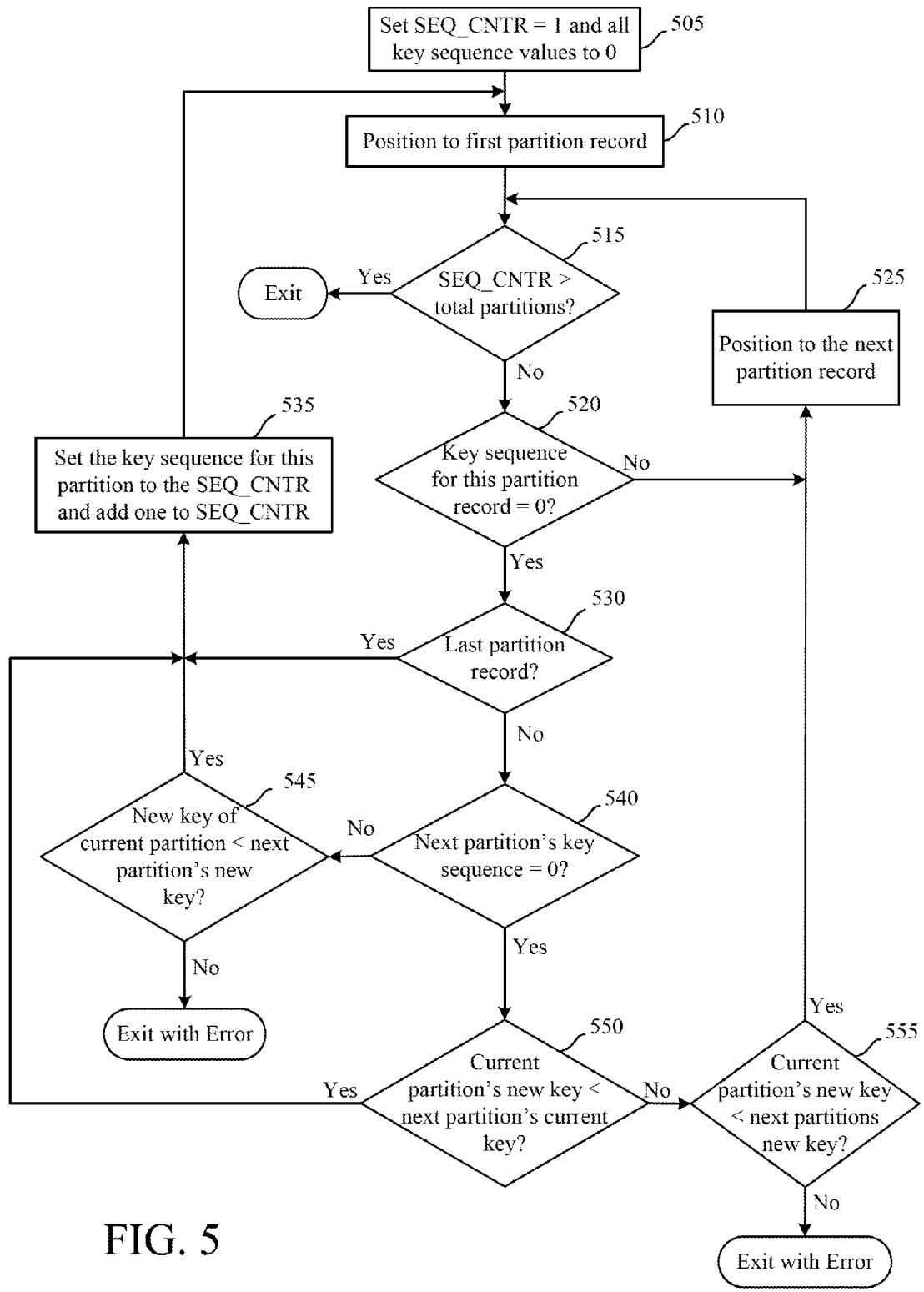
FIG. 5 is a flowchart illustrating a process for determining the sequence order for modifying the limit keys, according to an implementation.

FIG. 5 is a flowchart illustrating a process 500 for determining the sequence order for modifying the limit keys. In some implementations, limit key partition sequencer 112 may cause limit key alteration system 100 to perform the steps of process 500 as part of step 208 in FIG. 2. At 505, limit key alteration system 100 may initialize a sequence counter (e.g., SEQ_CNTR) to one and set the key sequence value for each partition to zero. The sequence counter represents the number of iterations or repetitions of process 500 that limit key alteration system 100 have performed. Thus, the counter is initially set to one for the first iteration. Limit key alteration system 100 may then begin with the data structure for the first partition (510). Using the example of FIG. 4, limit key alteration system 100 begins with data structure 425a. At 515, limit key alteration system 100 may determine whether the number of iterations (e.g., the sequence counter) is greater than the total partitions. If so (515, Yes), process 500 ends. If not (515, No), limit key alteration system 100 may determine whether the key sequence for the current partition is zero. If not (520, No), limit key alteration system 100 may go to the next successive partition, and repeat steps 515 and 520 with the next partition as the current partition. In such a manner, limit key alteration system 100 may find the first partition with a key sequence of zero.

When the first partition with a key sequence of zero is found (520, Yes), limit key alteration system 100 may determine whether the current partition is the last partition record. If so (530, Yes), limit key alteration system 100 may set the key sequence for the current partition to the value of the sequence counter, increase the sequence counter by one (535), and perform another iteration of the process (e.g., returning to step 510). If the partition is not the last partition (530, No), limit key alteration system 100 may determine whether the next successive partition's key sequence is zero. If the next partition's key sequence is not zero (540, No), limit key alteration system 100 may compare the new internal key of the current partition with the new internal key of the next partition. If the new key of the current partition is not less than the new key of the next partition (545, No), then the new limit keys do not have a valid sequence order and limit key alteration system 100 may exit process 500 with an error. The error indicates that a successful alteration cannot be completed using the supplied new limit key values. If the new key of the current partition is greater than the new key of the next partition (545, Yes), then limit key alteration system 100 may set the key sequence for the current partition to the sequence counter, add one to the sequence counter (535), and perform another iteration of the process.

If the next partition's key sequence is zero (540, Yes), limit key alteration system 100 may compare the new internal key of the current partition to the current internal key of the next partition (550). If the new key of the current partition is less than the current key of the next partition (550, Yes), limit key alteration system 100 may set the key sequence for the current partition to the sequence counter, add one to the sequence counter (535), and perform another iteration of the process. If the new key of the current partition is not less than the current key of the next partition (550, No), limit key alteration system 100 compares the new internal key of the current partition with the new internal key of the next partition (555). If the new key of the current partition is less than the new key of the next partition (555, Yes), limit key alteration system 100 may go to the next successive partition, and begin again at step 515 with the next partition as the current partition. Because the sequence counter has not been increased and the process is not starting with the first partition, this may not be considered a new iteration of the process. If the new key of the current partition is not less than the new key of the next partition (555, No), limit key alteration system 100 may exit process 500 with an error code that indicates that a successful alter sequence cannot be determined.

For example, limit key alteration system 100 may perform process 500 using the data structures 425 of FIG. 4. In such an example, after initializing the sequence counter to 1 and the key sequence values to zero, limit key alteration system 100 begins at data structure 425a for partition 1. The sequence counter is currently 1, the key sequence for data structure 425a is zero (520, Yes) and this is not the last partition record (520, No), so limit key alteration system 100 analyzes the key sequence for the next successive data structure 425b. The key sequence for 425b is currently zero (540, Yes), so limit key alteration system 100 compares the new internal key for 425a (e.g., 42424220110101FFFF) with the current internal key for 425b (e.g., 42424220110101FE0B). Because the new key for 425a is greater than the current key for 425b (550, No), limit key alteration system 100 compares the new internal key for 425a with the new internal key for 452b (e.g., 43434343201 10601FE0B). Because the new key for 425a is less than then new key for 425b (555, Yes), limit key alteration system 100 will use the data structure 425b as the current partition record and begin again at step 515.

At step 515 the sequence counter is still 1, and the key sequence for 425b is zero and the second partition is not the last partition, so limit key alteration system 100 analyzes the key sequence for the next partition (e.g., 425c). The key sequence for 452c is also zero (540, Yes), so limit key alteration system 100 compares the new internal key of 425b with the current internal key of 425c. Because the new key of 425b is greater than the current key of 425c (550, No), and because the new key of 425b is less than the new key of 425c (555, Yes), limit key alteration system 100 will use the data structure 425c as the current partition record and begin again at step 515. The sequence counter is still 1, and the key sequence for 425c is zero and the third partition is not the last partition, so limit key alteration system 100 looks at the key sequence for the next partition (e.g., 425d). The key sequence for 452d is also zero (540, Yes), so limit key alteration system 100 compares the new internal key of 425c with the current internal key of 425d. The new key of 425c is less than the current key of 425d (550, Yes), so limit key alteration system 100 sets the key sequence of 425c to 1 (the sequence counter, which represents the iteration number), adds one to the sequence counter (535), and begins a second iteration of the process by beginning with the data structure for the first partition (510).

The second iteration begins like the first, except when the limit key alteration system 100 has reached the point where the current partition is the second partition (making 425b the current partition data structure), the next partition's key sequence (e.g., the key sequence for 425c) is not zero (540, No). Thus, limit key alteration system will compare the new internal key of 425b with the new internal key of 425c. Because the new key of 425b is less than the new key of 425c (545, Yes), limit key alteration system 100 will set the key sequence of 425b to 2 (the sequence counter), add one to the sequence counter and begin another iteration of the process by beginning with the data structure for the first partition (510).

Because the key sequence for the next partition (e.g., 425b) is not zero (540, No), limit key alteration system 100 will compare the new internal key of 425a with the new internal key of 425b. Because the new key of 425a is less than the new key of 425b (545, Yes), limit key alteration system 100 will assign the key sequence of 425a to 3 (the sequence counter), add one to the sequence counter and begin another iteration of the process by beginning with the data structure for the first partition (e.g. 425a). Because the key sequence of the first three partitions are not zero, limit key alteration system 100 will advance (steps 520-525) until the last partition is the current partition. At step 530, because the fourth partition is the last partition record (530, Yes), limit key alteration system 100 will set the key sequence of 425d to 4 (the sequence counter), add one to the sequence counter and begin another iteration. At step 515, limit key alteration system 100 will determine that the sequence counter is greater than the number of partitions and, thus, process 500 ends. At the conclusion of process 500, limit key alteration system 100 has assigned partition 1 a sequence order of 3, partition 2 a sequence order of 2, partition 3 a sequence order of 1, and partition 4 a sequence order of 4.

Returning to FIG. 2, after determining the key sequencing, limit key alteration system 100 may determine whether an error was encountered while determining the key sequencing (210). If so (210, Yes), limit key alteration system 100 may generate data used to alert a user that the new limit key values have a sequencing error and cannot generate commands that result in a successful change of the limit key values (step 212). Thus, at step 212, limit key alteration system 100 may not generate any commands. But, if the sequence was successfully determined (210, No), then limit key alteration system 100 may generate commands to change the current limit key values to the new limit key values based on the determined sequence order (214). For instance, using the example of FIG. 4 in a DB2 database environment, limit key alteration system 100 may generate four ALTER commands in the order of partition 3, partition 2, partition 1, and partition 4. In another example, if a table with partitions does not exist in the system, limit key alteration system 100 may generate a CREATE command rather than an ALTER command, as appropriate. Process 200 then ends. Thus, the result of process 200 is either an indication that the user needs to modify the new limit key values or generation of commands that can be executed, for instance in a batch job, to successfully change the current limit key values to the new limit key values. In some embodiments, the user may cause the generated statements to execute at a later time (e.g., during the night, or some slower period of activity). In some embodiments, limit key alteration system 100 may execute the generated statements immediately. In some embodiments, step 214 may be optional, and limit key alteration system 100 may generate data used to communicate the determined sequence order to the user.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method of automatically generating commands used to change a plurality of limit key values, the method comprising:
   determining a current value for each of the plurality of limit keys, each limit key corresponding to a partition of a plurality of database partitions;
   determining a new value for each of the plurality of limit keys;
   generating, by at least one processor, a normalized internal key for the current value of each limit key;
   generating, by at least one processor, a normalized internal key for the new value of each limit key;
   iteratively determining, by the at least one processor, a sequence order for each limit key using the current normalized internal keys and the new normalized internal keys; and
   using the determined sequence order of each limit key to generate the commands used to change the value of each limit key from the current value to the new value.

2. The computer-implemented method of claim 1, wherein the database partitions are DB2 database partitions and the commands used to change the value of each limit key include ALTER commands and CREATE commands.

3. The computer-implemented method of claim 1, wherein the current normalized internal key is a binary string.

4. The computer-implemented method of claim 3, wherein each limit key comprises at least two columns and generating the normalized internal key includes appending a normalized internal key for a second column to a normalized internal key of a first column to create the binary string.

5. The computer-implemented method of claim 1, wherein as part of generating the normalized internal key for the new value of each limit key, the method includes generating a one's compliment of the normalized internal key when a sort order for the limit key is descending.

6. The computer-implemented method of claim 1, wherein iteratively determining the sequence order for each limit key comprises:
   tracking a number of iterations;
   with each iteration, beginning at a first partition and determining a first limit key having a sequence order of zero;
   determining whether a successive partition's limit key has a sequence order greater than zero;
   when the sequence order of the successive partition's limit key is greater than zero, determining whether the new normalized internal key of the first limit key is less than the new normalized internal key of the successive partition's limit key; and
   setting the sequence order of the first limit key to the number of iterations when it is determined that the new normalized internal key of the first limit key is less than the new normalized internal key of the successive partition's limit key.

7. The computer-implemented method of claim 6, further comprising:
   when the sequence order of the successive partition's limit key is not greater than zero, determining whether the new normalized internal key of the first limit key is greater than the current normalized internal key of the successive partition's limit key; and
   setting the sequence order of the first limit key to the number of iterations when it is determined that the new normalized internal key of the first limit key is greater than the current normalized internal key of the successive partition's limit key.

8. The computer-implemented method of claim 6, further comprising:
   exiting the iterating with an error code when it is determined that the new normalized internal key of the first limit key is not less than the new normalized internal key of the successive partition's limit key.

9. The computer-implemented method of claim 8, further comprising:
   automatically generating data used to alert a user in response to the exiting, wherein the alert indicates the commands cannot be generated to successfully change the current values of the plurality of limit keys.

10. The computer-implemented method of claim 1, wherein as part of determining the new value for each of the plurality of limit keys, the method further comprises:
   determining that a user has not supplied a new value for the limit key of a particular partition; and
   in response to the determining, copying the current value of the limit key for the particular partition to the new value of the limit key for the particular partition.

11. A computer program product, the computer program product being tangibly embodied on a computer-readable storage device storing instructions that, when executed, cause at least one processor to perform a process, the instructions comprising instructions to:
   determine a current value for each of a plurality of limit keys, each limit key corresponding to a partition of a plurality of database partitions;
   determine a new value for each of the plurality of limit keys;
   generate a current normalized internal key for the current value of each limit key;
   generate a new normalized internal key for the new value of each limit key;
   iteratively determine a sequence order for each limit key using the current normalized internal key and the new normalized internal key; and
   generate data used to indicate the sequence order for each limit key to a user.

12. The computer program product of claim 11, wherein the instructions to generate the data used to indicate the sequence order include instructions to generate an alert indicating that the sequence order could not be determined.

13. The computer program product of claim 11, wherein the instructions to generate the new normalized internal key for each limit key includes instructions to generate a one's compliment of the new normalized internal key when a sort order for a column for the limit key is descending.

14. The computer program product of claim 11, wherein the instructions to iteratively determine the sequence order for each limit key includes instructions to:
   track a number of iterations;
   with each iteration, begin at a first partition and determine a first limit key having a sequence order of zero;
   determine whether a successive partition's limit key has a sequence order greater than zero;
   when the sequence order of the successive partition's limit key is greater than zero, determine whether the new normalized internal key of the first limit key is less than the new normalized internal key of the successive partition's limit key; and
   set the sequence order of the first limit key to the number of iterations when it is determined that the new normalized internal key of the first limit key is less than the new normalized internal key of the successive partition's limit key.

15. The computer program product of claim 14, further comprising instructions to:
   when the sequence order of the successive partition's limit key is not greater than zero, determining whether the new normalized internal key of the first limit key is greater than the current normalized internal key of the successive partition's limit key; and
   setting the sequence order of the first limit key to the number of iterations when it is determined that the new normalized internal key of the first limit key is greater than the current normalized internal key of the successive partition's limit key.

16. The computer program product of claim 11, wherein the instructions to determine the new value for each of the plurality of limit keys include instructions to:
   determine that a user has not supplied a new value for the limit key of a particular partition; and
   in response to the determining, copy the current value of the limit key for the particular partition to the new value of the limit key for the particular partition.

17. The computer program product of claim 11, wherein the instructions to generate the data used to indicate the sequence order include instructions to generate commands used to change the value of each limit key from the current value to the new value.

18. A computer system for automatically generating commands used to change a plurality of limit key values including instructions recorded on a non-transitory computer-readable medium and executable by at least one processor, the system comprising:
   a partitioned database having a particular number of partitions, each partition being associated with a limit key of the plurality of limit keys;
   a limit key normalizer configured to:
      determine a current value for each of the limit keys,
      determine a new value for each of the limit keys,
      generate a current normalized internal key for the current value of each limit key, and
      generate a new normalized internal key for the new value of each limit key;
   a limit key partition sequencer configured to determine a sequence order for the limit key of each partition by comparing the current normalized internal keys and the new normalized internal keys in an iterative process that occurs the particular number of times; and
   a command generator configured to use the determined sequence order of each limit key to generate the particular number of commands, the commands being used to change the current value of each limit key to the new value.

19. The system of claim 18, wherein the partitions are DB2 database partitions and the commands used to change the current value of each limit key include ALTER commands and CREATE commands.

20. The system of claim 19, wherein the ALTER commands are generated in an order that corresponds with the sequence order of the limit keys.

21. The system of claim 17, wherein each limit key comprises at least two columns and limit key normalizer is configured to append a current normalized internal key for a second column to a current normalized internal key of a first column to create the internal key as part of generating a current normalized internal key.

22. The system of claim 18, wherein the limit key normalizer is further configured to:
   determine that a user failed to supply a new value for a particular limit key of the plurality of limit keys;
   when a sort order for a column associated with the particular limit key is ascending, assign the new value for the particular limit key to low values; and
   when the sort order for the column associated with the particular limit key is descending, assign the new value for the particular limit key to high values.

23. The system of claim 18, wherein as part of generating normalized internal keys the limit key normalizer is further configured to convert the new value for a limit key with a date data type to a year-month-day format, to convert the new value for a limit key with an integer data type to a binary number without commas, and to convert the new value for a limit key with a character data type to a fixed-length hexadecimal.

24. The system of claim 18, wherein as part of determining the sequence order for each limit key, the limit key partition sequencer is further configured to:
  track an occurrence number of the iterative process;
  for each iteration of the process, begin at a limit key for a first partition of the particular number of partitions and identify as a first limit key a partition's limit key having a sequence order of zero;
  determine whether a successive partition's limit key has a sequence order greater than zero;
  when the sequence order of the successive partition's limit key is greater than zero, determine whether the new normalized internal key of the first limit key is less than the new normalized internal key of the successive partition's limit key; and
  set the sequence order of the first limit key to the number of occurrences when it is determined that the new normalized internal key of the first limit key is less than the new normalized internal key of the successive partition's limit key.

25. The system of claim 18, wherein as part of using the determined sequence order to generate the particular number of commands the limit key normalizer is further configured to:
  determine that the new values for the limit keys do not resolve to a valid determined sequence; and
  generate data to alert a user that the new values for the limit keys are not valid.

* * * * *